United States Patent [19]

Landphair et al.

[11] Patent Number: 5,449,042
[45] Date of Patent: Sep. 12, 1995

[54] REPHASING CONTROLLING/CONTROLLED HYDRAULIC CYLINDERS IN FOLDING IMPLEMENT FRAME

[75] Inventors: Donald K. Landphair, Bettendorf, Iowa; Paul R. Riewerts, Port Byron, Ill.

[73] Assignee: Deere & Company, Moline, Ill.

[21] Appl. No.: 237,749

[22] Filed: May 4, 1994

[51] Int. Cl.$^6$ .............................................. A01B 63/22
[52] U.S. Cl. ................................... 172/456; 172/459; 172/468; 172/471; 172/485; 172/311; 280/43.23; 60/484; 91/525; 91/528
[58] Field of Search ............... 172/456, 457, 458, 459, 172/468, 471, 472, 473, 485, 486, 311; 56/11.9, 15.5; 280/43.17, 43.23; 60/484; 91/525, 528

[56] References Cited

U.S. PATENT DOCUMENTS

| | | |
|---|---|---|
| 2,928,482 | 3/1960 | Gillette . |
| 4,320,805 | 3/1982 | Winter .................... 172/456 X |
| 4,324,411 | 4/1982 | MacKenzie ............... 280/43.23 |
| 4,335,894 | 6/1982 | Swanson ................... 280/43.23 |
| 4,337,959 | 7/1982 | Bettin et al. .............. 280/43.23 |
| 4,339,139 | 7/1982 | Swanson ................... 280/43.23 |
| 4,346,763 | 8/1982 | Swanson et al. ............ 60/484 X |
| 4,354,688 | 10/1982 | Swanson ................... 60/484 X |
| 4,407,109 | 10/1983 | Swanson et al. ............ 56/11.9 |
| 4,411,070 | 10/1983 | Boyum et al. .............. 91/525 X |
| 4,607,708 | 8/1986 | Landphair et al. ......... 172/311 X |
| 5,358,055 | 10/1994 | Long et al. . |

OTHER PUBLICATIONS

Hydraulic diagram from John Deere manual p.30-10-4, printed in U.S.A.
Hydraulic diagram from John Deere manual p. 30-10-5, printed in U.S.A.

Primary Examiner—Randolph A. Reese
Assistant Examiner—Christopher J. Novosad

[57] ABSTRACT

The invention is directed to a foldable agricultural implement frame having a first pair of controlling/controlled lifting hydraulic cylinders for lifting and lowering the right wing section and the center section together in a level condition, and a second pair of controlling/controlled lifting hydraulic cylinders for lifting and lowering the left wing section and the center section together in a level condition. In the first pair of controlling/controlled hydraulic cylinders one of the hydraulic cylinders lifts the right wing section and the other lifts the center section. In the second pair of controlling/controlled hydraulic cylinders one of the hydraulic cylinders lifts the left wing section and the other lifts the center section. A rephasing valve assembly is used to rephase the controlling/controlled hydraulic cylinder pairs when the implement frame is folded and only the center section needs to be lifted and lowered. In rephasing the controlling and controlled hydraulic cylinders, the rephasing valve assembly couples the controlling hydraulic cylinder of the center section to the controlled hydraulic cylinder of the center section.

7 Claims, 3 Drawing Sheets

REPHASING CONTROLLING/CONTROLLED HYDRAULIC CYLINDERS IN FOLDING IMPLEMENT FRAME

BACKGROUND OF THE INVENTION

1. Field of the Invention

The invention is directed to four mechanically actuated hydraulic valves which rephase the controlling-/controlled lifting hydraulic cylinder pairs in a folding agricultural implement frame.

2. Description of the Prior Art

Typically agricultural implements, such as planters, grain drills and tillage equipment, are towed behind a draft vehicle to perform a specified operation. The support frames on which these implements are mounted are getting larger and larger. This enables the farmer to cover a wider area with each pass across the field.

The implement frames extend perpendicular to the fore/aft draft axis of the draft vehicle. Although these frames work well in the field in their working configuration, they become difficult to transport from field to field. As such many of these frames have folded transport configurations in which their transverse swath is reduced. One example of such a frame, is the front fold implement frame illustrated in U.S. Pat. No. 4,607,708. In this patent the implement frame is provided with two wing sections that fold forwardly so that they lie along the fore/aft draft axis of the draft vehicle.

It is also important that the row markers located at the end of the implement frame be locked into their retracted transport condition when the implement frame is folded into its transport configuration.

SUMMARY

It is an object of the present invention to rephase the controlling/controlled lifting hydraulic cylinder pairs on a folding agricultural implement frame so that the frame is lifted together and in a level condition in its working and transport configurations.

It is a feature of the present invention that the folding agricultural implement frame is provided with a first pair of controlling/controlled lifting hydraulic cylinders for one wing section and the center section; and a second pair of controlling/controlled lifting hydraulic cylinders for the other wing and the center section.

The implement frame of the present invention has right and left wing sections that are pivotally coupled to a center section by right and left fold pivots. In folding the implement frame the frame is first lifted by the controlling/controlled lifting hydraulic cylinder pairs together and in a level condition. The frame is then folded and lowered. The wing sections are locked into their transport configuration and the operator actuates a control lever on a frame mounted valve package to shift four two-position rephasing valves. These rephasing valves shift the first controlling lifting hydraulic cylinder from the first controlling/controlled lifting hydraulic cylinder pair and hydraulically couples it to the controlled lifting hydraulic cylinder of the second controlling/controlled hydraulic cylinder pair.

After the wing sections have been folded and locked together in their transport configuration, the operator shifts the four rephasing valves. The rephasing valves isolate the controlling and controlled lifting hydraulic cylinders on the wing sections and forms a new controlling/controlled lifting hydraulic cylinder pair for the center section. The center section is then raised for transport. In its transport configuration the implement frame is supported between the center section and the drawbar of the draft vehicle.

DETAILED DESCRIPTION

Figure 1:
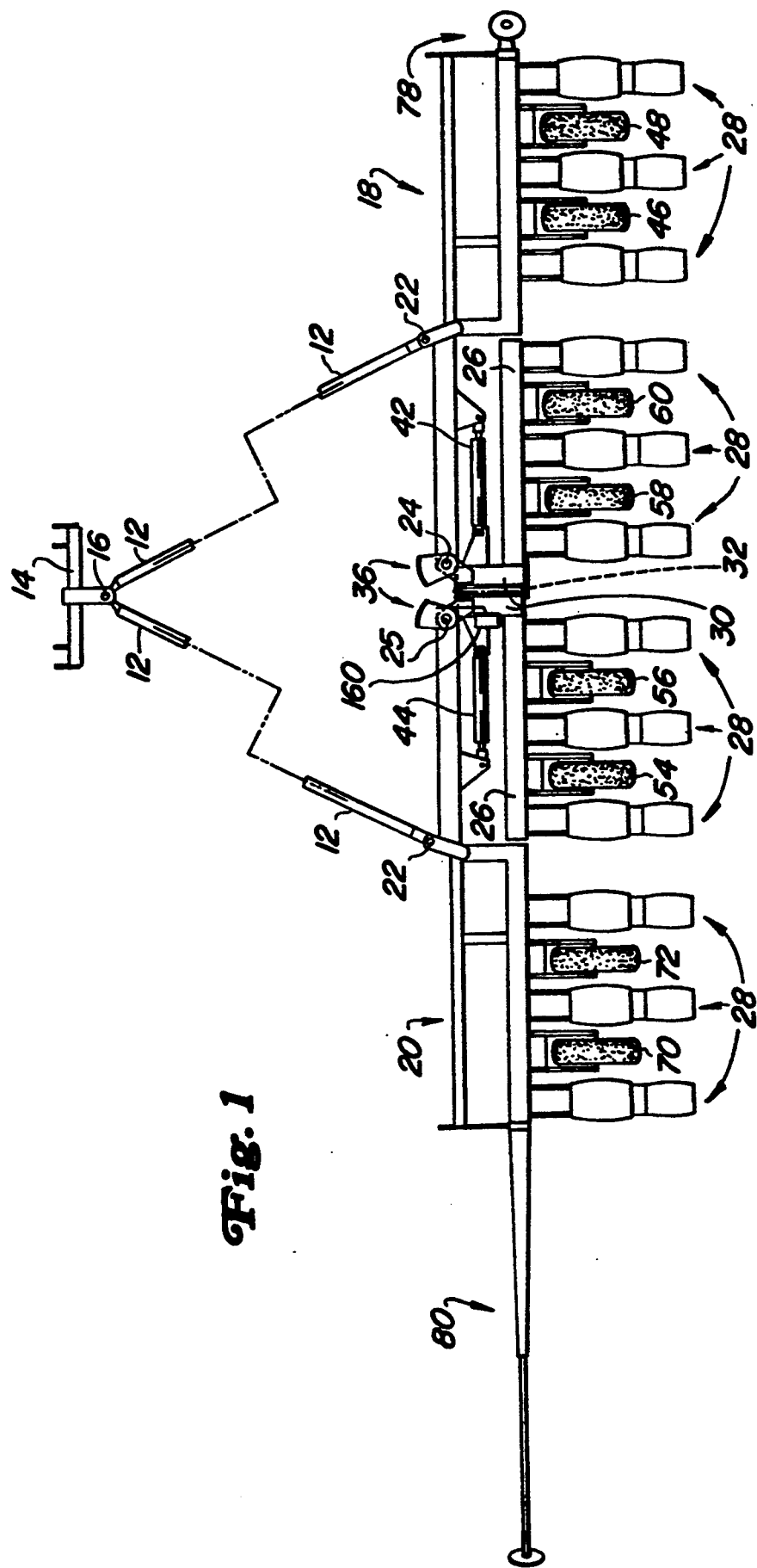
FIG. 1 is a top view of a forwardly foldable implement frame having planting units.

The implement frame 10, illustrated in FIG. 1, is a forwardly foldable frame that is provided with forwardly extending draft tubes 12 that are pivotally coupled to the draw bar 14 of a draft vehicle by vertical hitch pin 16. The rearward ends of the draft tubes 12 are pivotally coupled to right and left wing frame sections 18 and 20, respectively, by vertical pivot pins 22. The wing frame sections 18 and 20 are conventionally mirror images of one another and are attached to the center frame section 26 by first and second vertical fold pivots 24 and 25. Each of the frame sections maybe provided with planting units 28.

The center frame section 26 is provided with two forwardly extending fore/aft beams 30 that are pivotally interconnected by fore/aft horizontal pivot 32. The forwardly extending fore/aft beams 30 are pivotally coupled to wing frames sections 18 and 20 by vertical fold pivots 24 and 25. A pair of cam bumpers 36 are rigidly attached to the wing frame sections 18 and 20.

The fore/aft horizontal pivot 32 allows the vertical flexing of the wing frame sections 18 and 20 and the associated center frame sections 26. The vertical pivot 24 allows the wing frame sections to be forwardly folded from a working configuration, illustrated in FIG. 1, into a transport configuration.

The cam bumpers 36 include a horizontal plate 38 having an opening for receiving vertical fold pivot pins which are welded to the plate 38. The plate 38 carries a contact strip 40 which defines a cam surface on its outer edge. As the implement frame is folded, the wing frame sections 18 and 20 collapse towards each other since they are still capable of pivoting around fore/aft horizontal pivot 32. The cam bumpers 36 come into contact with one another as the frame is folded and act to lock the fore/aft horizontal pivot 32 rigid by locking out its ability to pivot. This locking arrangement is best described in U.S. Pat. No. 4,607,708, which is incorporated herein by reference.

Right and left double acting hydraulic folding cylinders 42 and 44 are located between the fore/aft beams 30 and the right and left wing sections 18 and 20, respectively. Extending these hydraulic cylinders folds the wing frame sections 18 and 20 forwardly so they are aligned along a fore/aft axis in a transport configuration. Retracting the hydraulic folding cylinders 42 and 44 extends the wing frame sections 18 and 20 so they are arranged in their working configuration, where the wing frame sections are arranged perpendicular to the fore/aft axis.

The right wing frame section 18 is supported on ground engaging wheels 46 and 48 which can be raised and lowered by hydraulic lifting cylinders 50 and 52 (see FIG. 2), respectively. The center frame section 26 is supported on ground engaging wheels 54, 56, 58 and 60 which can be raised and lowered by hydraulic lifting cylinders 62, 64, 66, and 68, respectively. The left wing frame section 20 is supported on ground engaging wheels 70 and 72 which can be raised and lowered by hydraulic lifting cylinders 74 and 76.

The outer ends of the right and left wing frame sections 18 and 20 are provided with right and left row markers 78 and 80, respectively. The row markers 78 and 80 are raised and extended into their marking position by hydraulic marker cylinders 82 and 84 (see FIG. 2), respectively.

Figure 2:
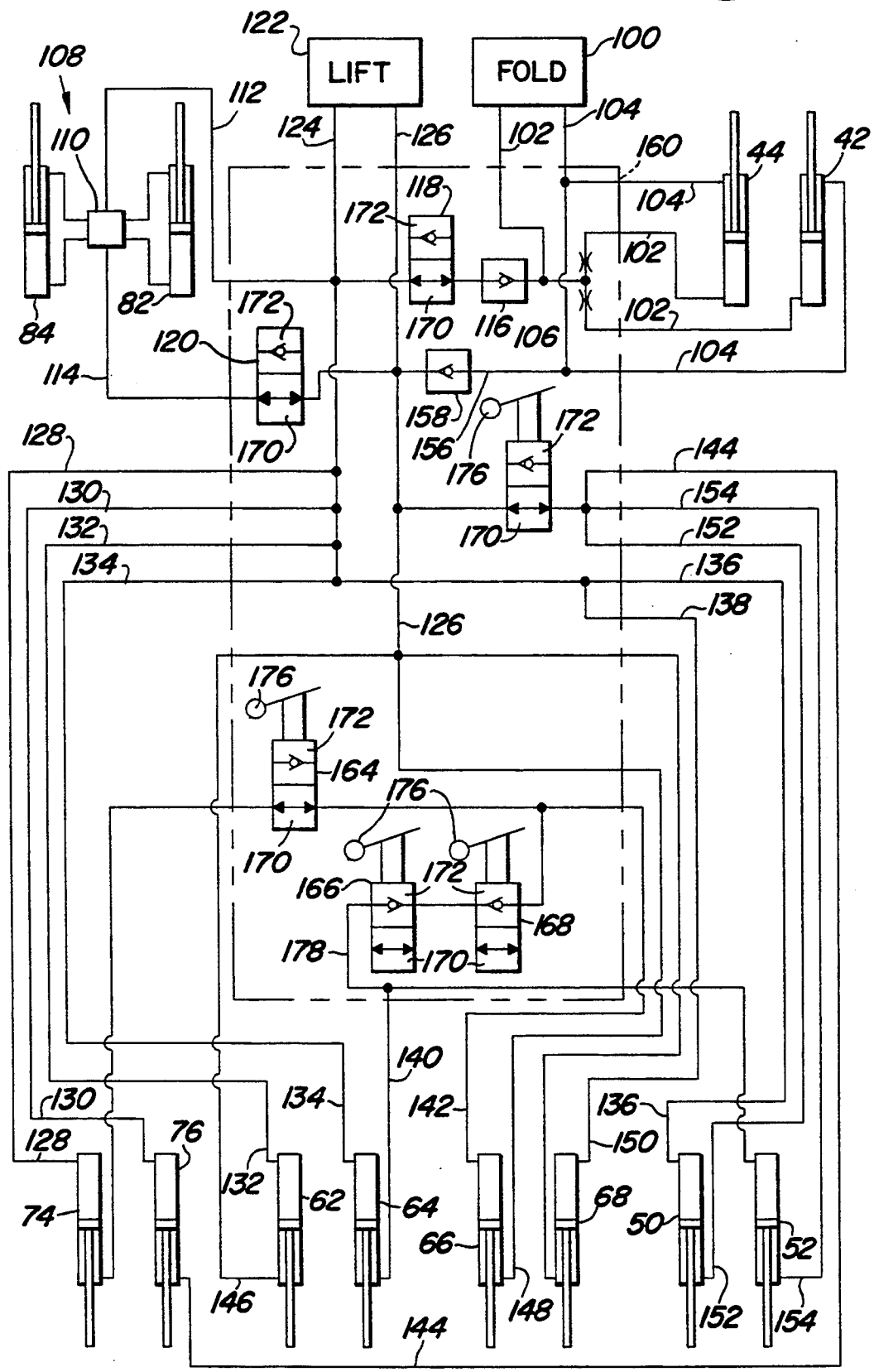
FIG. 2 is a hydraulic schematic of the implement frame folding and lifting hydraulic circuits.
Figure 3:
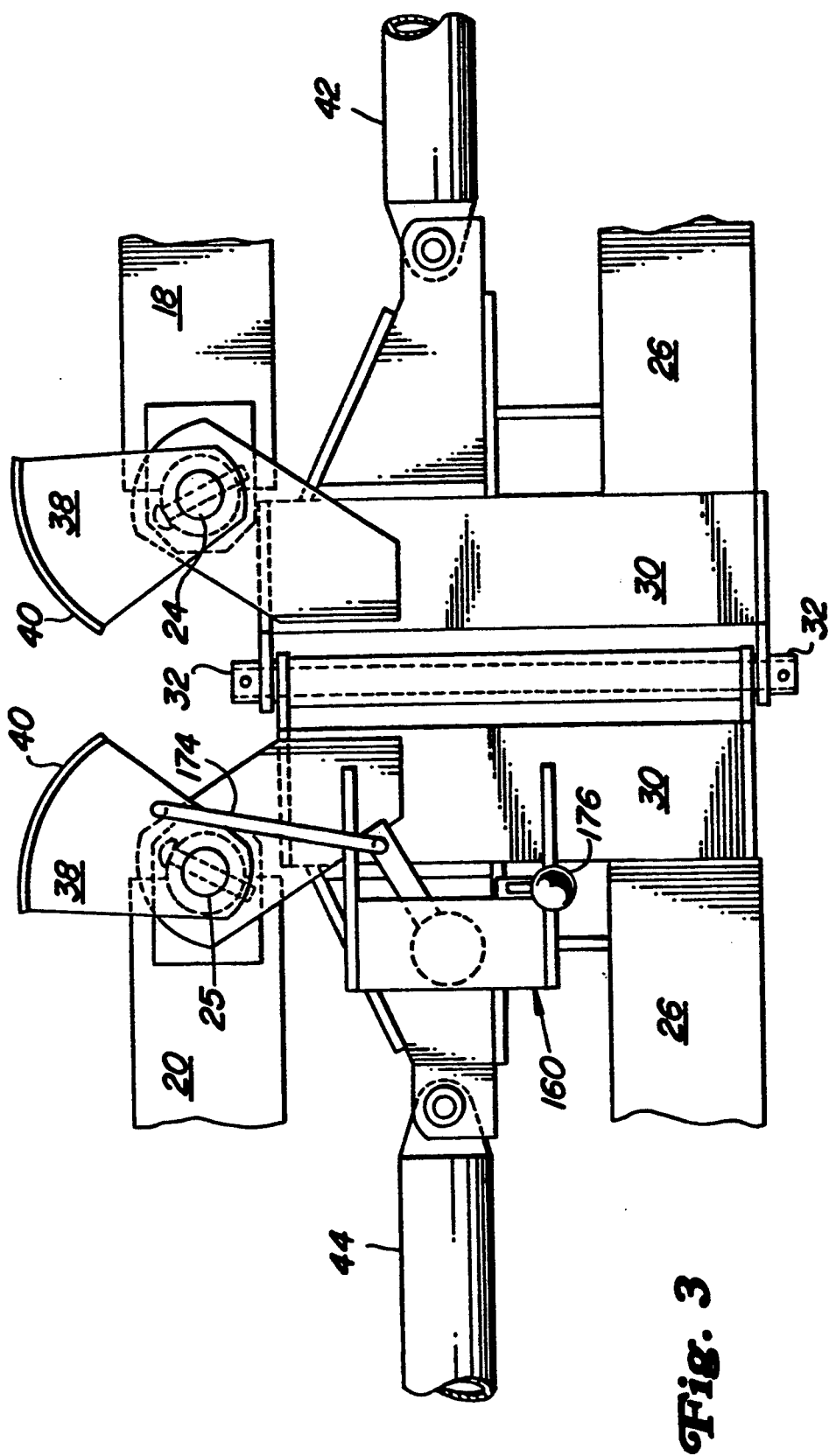
FIG. 3 is a close up top view of the mechanical linkage and the valve package.

The hydraulic operations are best illustrated by the hydraulic schematic FIG. 2. The operator in the cab of the draft vehicle is provided with a three-position folding control valve 100 having a first folding supply/return line 102 and a second folding supply/return line 104. Directing pressurized fluid through the first folding supply/return line 102 extends folding cylinders 42 and 44, folding the implement frame 10 into its transport configuration. As the folding cylinders 42 and 44 are extended, exhausted fluid is directed to sump, not shown, through the second folding supply/return line 104 and control valve 100.

A row marker branch line 106 extends from the first folding supply/return line 102 to the row marker hydraulic circuit 108. Branch line 106 directs pressurized hydraulic fluid to the row marker sequencer valve 110 through the first marker supply/return line 112. This application of pressurized fluid from the folding circuit maintains both row marker hydraulic cylinders 82 and 84 in their retracted position thus maintaining the row markers 78 and 80 in their folded transport condition. The row marker hydraulic circuit 108 is also provided with a second marker supply/return line 114 which is coupled to the sequencer valve 110. The row marker hydraulic circuit 108 and sequencer valve 110 are of a conventional configuration.

A check valve 116 is located in the branch line 106 to prevent pressurized fluid from flowing to the folding cylinders 42 and 44 from the row marker hydraulic circuit 108 or from the lifting hydraulic circuit. A first mechanically switched two-position row marker latching valve 118 is also located in branch line 106. A second mechanically switched row marker latching valve 120 is located in second marker supply/return line 114. The function and purpose of these row marker latching valves will be discussed in more detail below.

The lifting hydraulic circuit is provided with a three-position lifting control valve 122 having a first lifting supply/return line 124 and a second lifting supply/return line 126. To lift the implement frame 10 pressurized hydraulic fluid is directed through the first lifting supply/return line 124 to six branch supply/return lines 128, 130, 132, 134, 136 and 138. The branch lines in turn direct the fluid to hydraulic cylinders 74, 76, 62, 64, 50 and 68 respectively.

Hydraulic cylinder 64 is a controlling hydraulic cylinder which controls controlled hydraulic cylinder 52 through supply/return line 140. Similarly hydraulic cylinder 74 is a controlling hydraulic cylinder which controls controlled hydraulic cylinder 66 through supply/return line 142.

During lifting, fluid exhausted by hydraulic cylinders 76, 62, 66, 68, 50 and 52 is directed to branch supply/return lines 144, 146, 148, 150, 152 and 154, respectively, then to second lifting supply/return line 126.

During planting operations constant regulated downforce pressure is automatically controlled by control valve 122. As downforce is increased pressurized hydraulic fluid is directed through supply/return line 126 transferring frame weight from the tires to the planter unit 28. Unfolding branch line 156 is coupled to the second lifting supply/return line 126 and the second folding supply/return line 104. Branch line 156 is provided with a check valve 158. Therefore, whenever pressurized hydraulic fluid is directed to the lift cylinders 50, 52, 62, 64, 66, 68, 74 and 76 through the second lifting supply/return line 126, pressurized hydraulic fluid is directed to the folding cylinders 42 and 44 through branch line 156 past check valve 158, retracting the cylinders and keeping the frame extended. In this way no mechanical locks or latches are required to keep the frame in its extended working position.

A valve package 160 is mounted to the left fore/aft beam 30 of the center frame section adjacent 26. The valve package contains six mechanically shifted two-position valves 118, 120, 162, 164, 166 and 168. In addition the valve package contains check valves 116 and 158.

Row marker latching valves 118 and 120 are two-position valves. The first position 170 is a flow position, and allows fluid to flow through the valve. The valves are shifted into this position when the implement is extended into its working position, as illustrated in FIG. 2. The second position 172 is a check position, and prevents the flow of hydraulic fluid from the row marker hydraulic circuit 108. When valves 118 and 120 are in the second position 172 the row markers cannot be unfolded because hydraulic fluid cannot be exhausted from the row marker hydraulic circuit 108.

Valves 118 and 120 are shifted by rod 174 which is mounted to left cam bumper 36. As the implement frame is folded and unfolded, the bumper 36 moves relative to the center frame section 26 shifting the rod 174 and thereby valves 118 and 120. The rod 174 shifts the valves 118 and 120 into their second checked position 172 as the frame is folded into its transport configuration; and shifts the valves 118 and 120 into their first flow position 170 as the implement frame 10 is unfolded into its working configuration. By automatically shifting the valves 118 and 120 into their checked positions 172 when the implement frame 10 is folded, the row markers 78 and 80 are prevented from being prematurely or accidentally unfolded when the frame 10 is in its transport position.

Hydraulic lift cylinders 50, 62, 68 and 76 are auxiliary cylinders used to spread out the lifting load on the implement frame 10. Hydraulic lift cylinders 64 and 74 are controlling cylinders, that control the operation of controlled lift cylinders 52 and 66, respectively. Controlling cylinder 64 is one of the cylinders lifting the center section 26 of the implement frame 10, whereas its controlled cylinder 52 is one of the cylinders lifting the right wing section 18. This relationship of the cylinders insures that the right wing section 18 and the center section 26 are lifted and lowered together in a level condition. Similarly the controlling cylinder 74 is one of the cylinders that lift the left frame section 20, whereas the controlled cylinder 66 is one of the cylinders that lift the center section 26. This relationship insures that the left wing section 20 and the center section 26 are lifted and lowered together in a level condition. Therefore, by having controlling and controlled cylinders on both wing sections 18 and 20 and the center section 26, the total implement frame 10 is lifted and lowered together in a level condition.

In preparing the implement frame 10 for transport the frame 10 is first lifted by the lift cylinders 50, 52, 62, 64, 66, 68, 74 and 76 and then folded so that the wing frames 18 and 20 lie along the fore/aft axis of the draft vehicle. The operator then lowers the frame 10 and dismounts the draft vehicle. The operator latches the wing frames 18 and 20 together and shifts lever 176 which shifts the rephasing valve assembly. The rephasing valve assembly comprises a pair of lockout valves 162 and 164 and a pair of cross over valves 166 and 168. When the operator shifts lever 176, lockout valves 162 and 164 shift from a flow position 170 to a checked position 172, and cross over valves 166 and 168 shift from a checked position 172 to a flow position 170.

Lockout valve 162 closes lines 144, 152 and 154 from supply/return line 126 locking the hydraulic cylinders 50, 52 and 76 in their frame lowered position. Lockout valve 164 closes line 142 isolating controlling cylinder 74 from controlled cylinder 66 locking hydraulic cylinder 74 in its frame lowered position. Therefore when the frame 10 is again raised for transport, only the center section 26 will be raised and the implement frame 10 will be supported between the center frame wheels 54, 56, 58 and 60 an the drawbar 14.

Cross over valves 166 and 168 are located in cross over line 178 which is located between hydraulic line 140 and 142. When in their flow position 170, the cross over valves 166 and 168 provide a short circuit path between controlling cylinder 64 and controlled cylinder 66. Lockout valve 164 isolates the original controlling/controlled cylinder pair 74/66 from one another. Lockout valve 162 locks controlled cylinder 52 which was originally part of the controlling/controlled pair 64/52. As such, the controlling/controlled valves have been rephased so that controlling cylinder 64 now controls controlled cylinder 66.

When the operator lifts the folded implement frame 10 hydraulic cylinders 62, 64, 66 and 68 of the center section 26 are extended raising the frame 10 and supporting the frame 10 between the center section 26 and the drawbar 14. By using the rephased controlling/controlled cylinder pair 64/66, the center section 26 can be lifted and lowered together in a level condition.

An operator, in folding the implement frame 10 from an extended working position, as illustrated in FIGS. 1 and 2, to a transport position performs the following steps. First the operator shifts lifting valve 122 to lift the frame 10 by directing pressurized hydraulic fluid through supply/return line 122. This step also raises both row markers by directing pressurized fluid to the row marker hydraulic circuit 108 through line 112. After the frame has been lifted, the operator next shifts folding valve 100 to fold the frame by directing pressurized hydraulic fluid through supply/return line 102 extending hydraulic folding cylinders 42 and 44. Additional hydraulic fluid is directed to the row marker circuit through branch line 106, to maintain the row markers 78 and 80 in a fully folded position. During the folding process rod 174, shifts valves 118 and 120, locking the row markers 78 and 80 in their folded position. After the implement frame 10 has been fully folded the operator lowers the frame 10 and dismounts the draft vehicle. The operator latches the wing sections 18 and 20 together and shifts lever 176, shifting lockout valves 162 and 164 to their checked position 172, and shifting cross over valves 166 and 168 to their flow position 170. The operator then mounts the draft vehicle and actuates the lift control valve 122 to lift frame 10 by directing pressurized hydraulic fluid through supply/return line 124 to center section hydraulic cylinders 62, 64 and 68. Controlled lifting cylinder 66 receives pressurized hydraulic fluid exhausted from controlling cylinder 64. The frame is lifted on wheels 54, 56, 58 and 60 and supported between the center section 26 and the drawbar 14.

The invention should not be limited by the above described embodiment, but should be limited solely by the claims that follow.

We claim:

1. A foldable agricultural implement frame having an extending working configuration and a folded transport configuration, the implement frame comprising:

a right wing section having at least one support wheel and a right wing section lifting hydraulic cylinder for raising and lowering the right wing section;

a center section pivotally coupled to the right wing section by a right fold pivot, having at least two support wheels and two lifting hydraulic cylinders, one lifting cylinder being associated with each support wheel for raising and lowering the center section;

a left wing section pivotally coupled to the center section by a left fold pivot, the left wing section having at least one support wheel and a left wing section hydraulic lifting cylinder for raising and lowering the left wing section;

a lifting hydraulic circuit which hydraulically couples the lifting hydraulic cylinders together to form a first pair of controlling/controlled hydraulic cylinders with one of the center lifting hydraulic cylinders and the right wing section hydraulic cylinder, so that the center section and the right wing section can be lifted and lowered together in a level condition, and a second pair of controlling/controlled hydraulic cylinders with one of the center section lifting hydraulic cylinder and the left wing section hydraulic cylinder, so that the center section and the left wing section can be lifted and lowered together in a level condition, whereby one of the center section lifting hydraulic cylinders is a controlling hydraulic cylinder and one is a controlled hydraulic cylinder;

a rephasing valve assembly for redirecting the hydraulic circuit so that the center section lifting hydraulic cylinder that is a controlling hydraulic cylinder is hydraulically coupled to the center section lifting hydraulic cylinder that is the controlled hydraulic cylinder, when the rephasing valve assembly is shifted, so that the center section, by itself, can be lifted and lowered together in a level condition.

2. An implement frame as defined by claim 1 wherein the rephasing valve assembly comprises two lockout valves each having a flow position and a checked position, when the rephasing valve assembly is shifted the lockout valves are shifted from their flow position to their checked position, in their checked position the lockout valves hydraulically lock the right wing lifting hydraulic cylinder and the left wing lifting hydraulic cylinder in their frame lowered position.

3. An implement frame as defined by claim 2 wherein the rephasing valve assembly further comprises two cross over valves each having a flow position and a checked position, when the rephasing valve is shifted the cross over valves are shifted from their checked position to their flow position, in their flow position the cross over valves provide a short circuit path between the center section controlling lifting hydraulic cylinder and the center section controlled lifting hydraulic cylinder so that the center section, by itself, can be lifted and lowered together in a level condition.

4. An implement frame as defined by claim 3 wherein the rephasing valve assembly is located in a valve package mounted to the implement frame.

5. An implement frame as defined by claim 4 wherein the valve package is mounted to the center section of the implement frame.

6. An implement frame as defined by claim 5 wherein the rephasing valve assembly is shifted manually.

7. An implement frame as defined by claim 1 wherein the rephasing valve assembly further comprises two cross over valves each having a flow position and a checked position, when the rephasing valve is shifted the cross over valves are shifted from their checked position to their flow position, in their flow position the cross over valves provide a short circuit path between the center section controlling lifting hydraulic cylinder and the center section controlled lifting hydraulic cylinder so that the center section, by itself, can be lifted and lowered together in a level condition.

* * * * *